US008787175B2

(12) United States Patent
Elias et al.

(10) Patent No.: US 8,787,175 B2
(45) Date of Patent: *Jul. 22, 2014

(54) SYSTEM FOR ADVERTISING ROUTING UPDATES

(75) Inventors: Mark A. Elias, Eastpointe, MI (US); Michael Satterlee, Clifton Park, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/536,437

(22) Filed: Jun. 28, 2012

(65) Prior Publication Data

US 2012/0263188 A1  Oct. 18, 2012

Related U.S. Application Data

(63) Continuation of application No. 11/677,556, filed on Feb. 21, 2007, now Pat. No. 8,233,395.

(51) Int. Cl.

| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04L 12/28 | (2006.01) |
| H04L 12/16 | (2006.01) |
| H04Q 11/00 | (2006.01) |
| H04L 12/56 | (2006.01) |

(52) U.S. Cl.
CPC ............... *H04L 45/02* (2013.01); *H04L 45/00* (2013.01); *H04L 45/24* (2013.01); *H04L 45/26* (2013.01); *H04L 45/28* (2013.01)
USPC .......................... 370/237; 370/238; 370/256

(58) Field of Classification Search
None
See application file for complete search history.

(56) References Cited

U.S. PATENT DOCUMENTS

| 6,339,595 B1 | 1/2002 | Rekhter et al. |
| 6,392,997 B1 | 5/2002 | Chen |

(Continued)

FOREIGN PATENT DOCUMENTS

| EP | 1580940 | 9/2005 |
| EP | 1737168 | 12/2006 |
| EP | 1768335 | 3/2007 |

OTHER PUBLICATIONS

M. Caesar, D. Caldwell, N. Feamster, J. Rexford, A. Shaihk and J. Merewe, Design and Implementation of a Routing Control Platform.*

(Continued)

*Primary Examiner* — John Blanton
*Assistant Examiner* — Christopher Crutchfield
(74) *Attorney, Agent, or Firm* — Hanley, Flight & Zimmerman, LLC

(57) ABSTRACT

Systems and methods for advertising routing updates are disclosed. An example method includes forwarding a proposed routing update from a provider edge router to first and second customer edge routers when a route reflector determines that the proposed routing update having a first route target represents a desirable routing configuration for the provider edge router; and when the route reflector determines that the proposed routing update represents an undesirable routing configuration for the provider edge router: forwarding a first substitute routing update from the provider edge router to the first customer edge router different from the proposed routing update and including a second route target different from the first route target; and forwarding a second substitute routing update from the provider edge router to the second customer edge router different from the proposed routing update and including a third route target different from the first route target.

20 Claims, 3 Drawing Sheets

(56) References Cited

U.S. PATENT DOCUMENTS

| | | | |
|---|---|---|---|
| 6,574,663 | B1 | 6/2003 | Bakshi et al. |
| 7,523,190 | B1 * | 4/2009 | Bickerstaff et al. ........... 709/224 |
| 7,529,257 | B1 | 5/2009 | Tappan |
| 8,233,395 | B2 * | 7/2012 | Elias et al. .................... 370/237 |
| 2002/0181477 | A1 | 12/2002 | Mo et al. |
| 2002/0184388 | A1 | 12/2002 | Yaseen et al. |
| 2002/0191541 | A1 | 12/2002 | Buchanan et al. |
| 2004/0037275 | A1 | 2/2004 | Li et al. |
| 2005/0025069 | A1 | 2/2005 | Aysan |
| 2006/0029035 | A1 | 2/2006 | Chase et al. |
| 2006/0083215 | A1 | 4/2006 | Uttaro |
| 2006/0088031 | A1 | 4/2006 | Nalawade |
| 2006/0233181 | A1 | 10/2006 | Raszuk et al. |
| 2006/0245374 | A1 | 11/2006 | Patel et al. |
| 2008/0089334 | A1 | 4/2008 | Soja-Molloy et al. |
| 2008/0198859 | A1 | 8/2008 | Elias et al. |

OTHER PUBLICATIONS

Olivier Bonaventure, Steve Uhlig and Bruno Quoitin, The Case for More Versatile BGP Route Reflectors, Internet Engineering Task Force Draft, Jul. 2004, pp. 1-15.*

E. Rosen and Y. Rekhter, BGP/MPLS IP Virtual Private Networks, RFC 4364, Feb. 2006, pp. 1-48.*

Office action issued by United States Patent and Trademark Office in connection with U.S. Appl. No. 11/554,152 on Oct. 15, 2010 (17 pages).

Office action issued by United States Patent and Trademark Office in connection with U.S. Appl. No. 11/554,152 on Feb. 3, 2010 (20 pages).

Office action issued by United States Patent and Trademark Office in connection with U.S. Appl. No. 11/554,152 on Aug. 17, 2009 (19 pages).

Office action issued by United States Patent and Trademark Office in connection with U.S. Appl. No. 11/554,152 on Jan. 27, 2009 (18 pages).

D Walton, A. Retana, E. Chen, Advertisement of Multiple Paths in BGP, Internet Engineering Task Force Draft, Aug. 2005, pp. 1-8.

Phillip Smith, BGP for Internet Service Providers, Cisco Systems Presentation at SANOG I, Jan. 2003, pp. 1-37.

M. Caesar, D. Caldwell, N. Feamster, J. Rexford, A. Shaihk and J. Merewe, Design and Implementation of a Routing Control Platform, Proceedings of the 2nd Symposium on Networked Systems Design and Implementation, pp. 15-28, 2005.

Mark Sportack, IP Routing Fundamentals, Cisco Press, Feb. 19, 1999, pp. 1-9.

Bonaventure et al., "The case for More Versatile BGP Route Reflectors", Internet Engineering Task Force, Internet Draft; Jul. 2004; 20 pages; http://tools.ietf.org/html/draft-bonaventure-bgp-route-reflectors-00, website last visited Jul. 14, 2008.

Rosen et al., "BGP/MPLS IP Virtual Private Networks (VPNs)", Network Working Group; Feb. 2006; 44 pages; http://www.ietf.org/rfc/rfc4364.txt, website last visited Jul. 14, 2008.

Office action issued by United States Patent and Trademark Office in connection with U.S. Appl. No. 11/677,556 on May 13, 2009 (24 pages).

Office action issued by United States Patent and Trademark Office in connection with U.S. Appl. No. 11/677,556 on Nov. 12, 2009 (20 pages).

Office action issued by United States Patent and Trademark Office in connection with U.S. Appl. No. 11/677,556 on Jun. 18, 2010 (22 pages).

Office action issued by United States Patent and Trademark Office in connection with U.S. Appl. No. 11/677,556 on Jan. 21, 2011 (24 pages).

Notice of Allowance issued by United States Patent and Trademark Office in connection with U.S. Appl. No. 11/677,556 on Mar. 29, 2012 (5 pages).

* cited by examiner

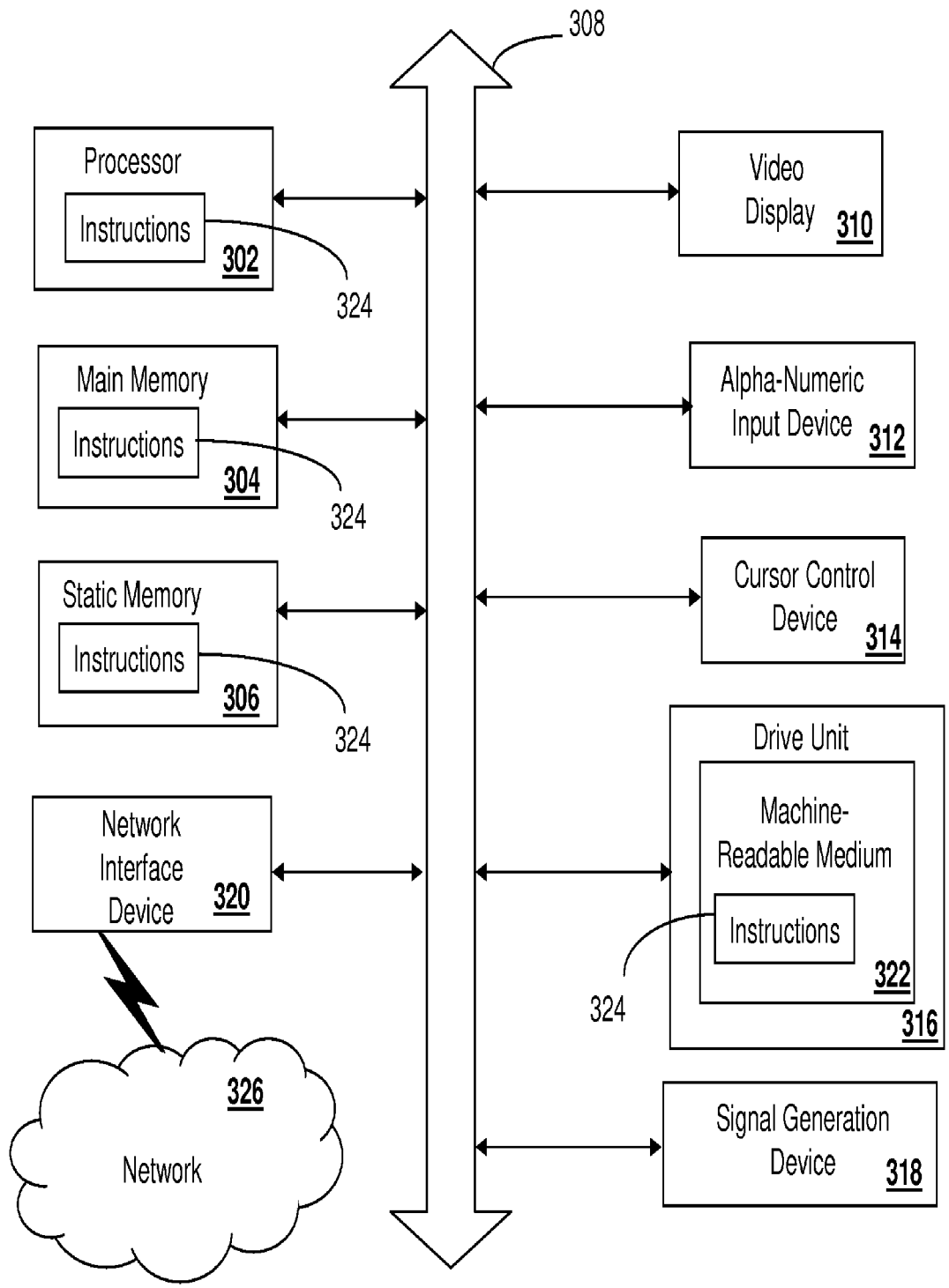

SYSTEM FOR ADVERTISING ROUTING UPDATES

RELATED APPLICATIONS

This patent arises from a continuation of U.S. patent application Ser. No. 11/677,556, filed on Feb. 21, 2007, now U.S. Pat. No. 8,233,395, which is hereby incorporated by reference herein in its entirety.

FIELD OF THE DISCLOSURE

The present disclosure relates generally to packet switched networks, and more specifically to a system for advertising routing updates.

BACKGROUND

Presently, common route reflectors in a Packet-Switched (PS) communication system broadcast routing updates supplied by a Provider Edge (PE) router to other PE routers assigned thereto. The recipient PE routers determine if they have an interest in the routing update according to the customer virtual private networks they serve.

Based on this method, advertisements generated by route reflectors are often received by uninterested PE routers. Moreover, the routing updates that are accepted by some of the PE routers at times can result in inefficient routing configurations which can impact performance and utilization of the PS communication system.

A need therefore arises for a system for advertising routing updates.

BRIEF DESCRIPTION OF THE DRAWINGS

FIG. 3 is a diagrammatic representation of a machine in the form of a computer system within which a set of instructions, when executed, may cause the machine to perform any one or more of the methodologies discussed herein.

DETAILED DESCRIPTION

Embodiments in accordance with the present disclosure provide a system for advertising routing updates.

In a first embodiment of the present disclosure, a Route Reflector (RR) can have a controller element that generates from a routing update a plurality of dissimilar routing advertisements transmitted in whole or in part to one or more Provider Edge (PE) routers operating in a Packet-Switched (PS) communication system.

In a second embodiment of the present disclosure, a PE router can have a controller element that receives a plurality of dissimilar routing advertisements generated by an RR.

In a third embodiment of the present disclosure, a computer-readable storage medium in a CE router can have computer instructions for receiving by way of a PE router in whole or in part a plurality of dissimilar routing advertisements generated by an RR from a routing update.

Figure 1:
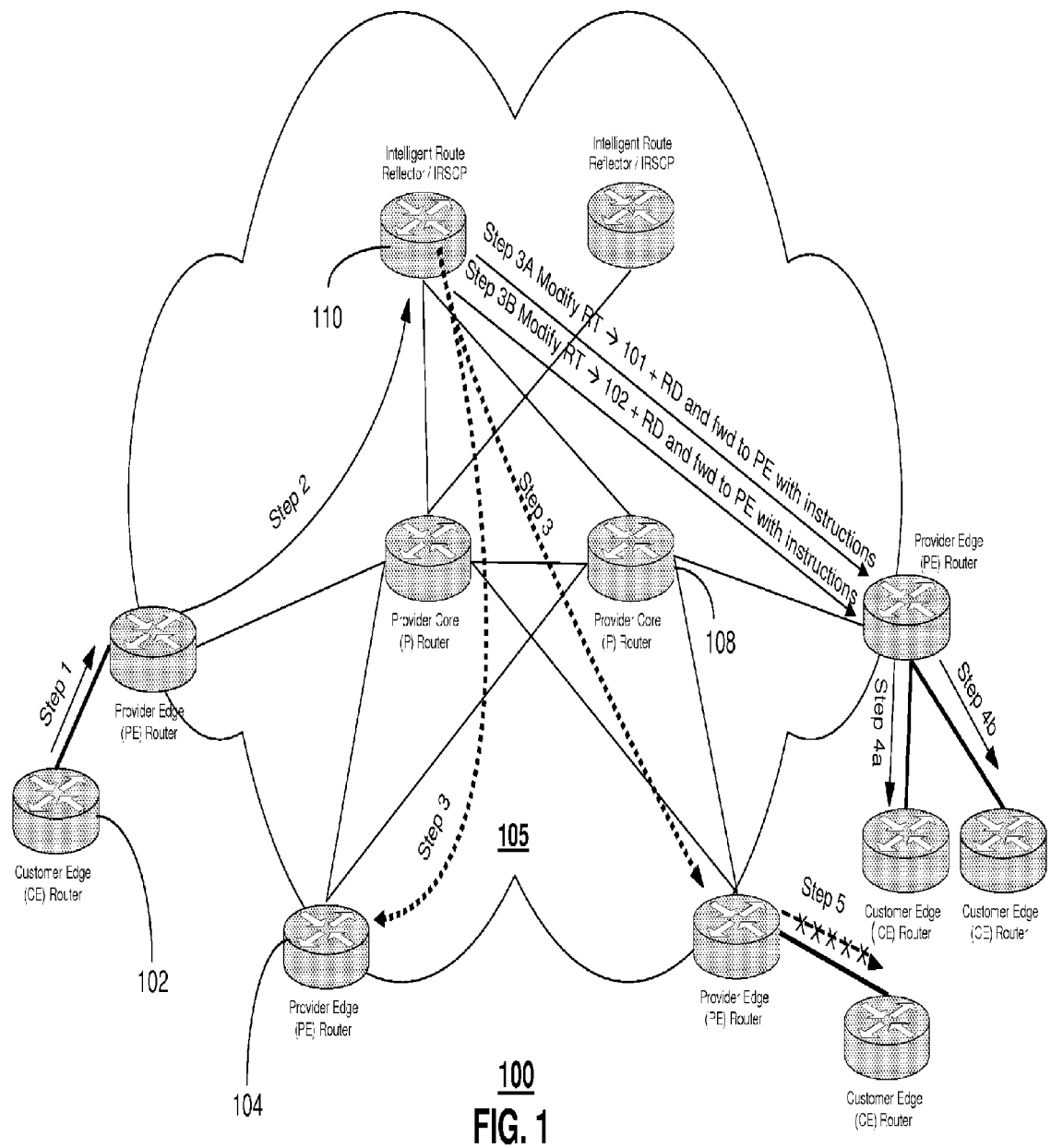
FIG. 1 depicts an exemplary embodiment of a packet-switched communication system.

FIG. 1 depicts an exemplary embodiment of a Packet-Switched (PS) communication system 100. The communication system 100 can comprise Customer Edge (CE) routers 102 coupled to a corresponding Provider Edge (PE) router 104 networked with other PE routers by way of a plurality of network elements operating according to a Multi-Protocol Label Switching (MPLS) standard ("MPLS network 105"). The MPLS network 105 includes among other things network elements such as common packet switching routers 108 and route reflectors (RR) 110 which advertise routing updates throughout the MPLS network according to method 200 of FIG. 2. The MPLS network 105 supports the exchange of packet traffic between CE routers 102 connected by Virtual Private Networks (VPNs).

The CE and PE routers 102, 104 include among other things common routing technology for routing packets between network elements of the communication system 100. The RRs 110 also including common routing technology for advertising routing updates to PE routers 104 according to methods described by the present disclosure. The aforementioned routing technologies can represent hardware and/or software components used in packet switching networks.

Figure 2:
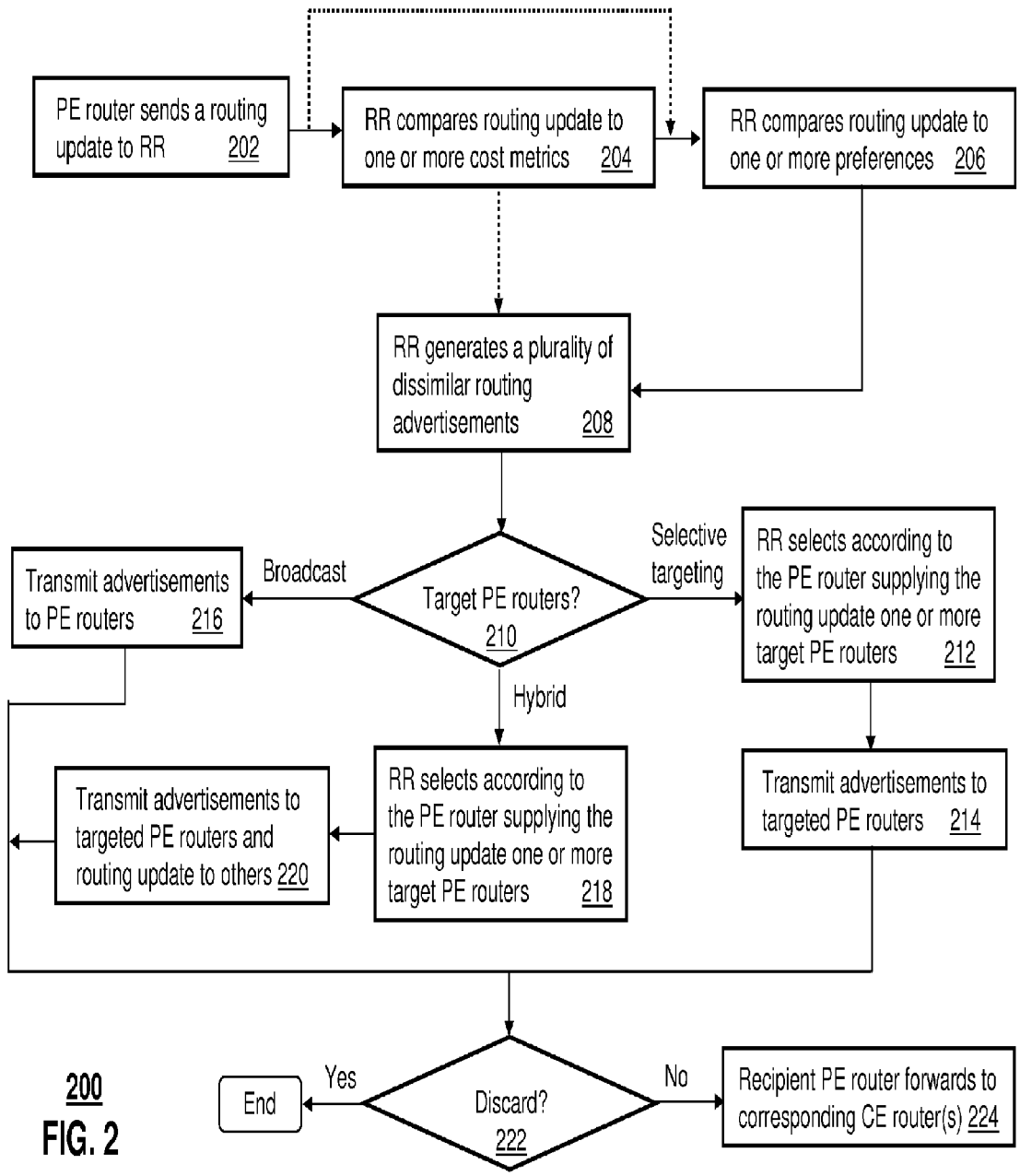
FIG. 2 depicts an exemplary method operating in the communication system.

The functions of the aforementioned network elements of the communication system 100 can be described by an exemplary method 200 depicted in FIG. 2. Method 200 begins with step 202 in which a select one of the PE routers 104 of the MPLS network 105 transmits a routing update to an RR 110 (see "Step 1" of FIG. 1). The routing update can be initiated by a CE router 102 associated with the PE router 104, or independently by said PE router 104. In either case, the routing update is submitted to the RR 110 by a PE router 104 (see "Step 2" of FIG. 1). The routing update can include among other things an export Routing Target (RT) and routing attributes that can be used to change a Virtual Routing and Forwarding (VRF) table of one or more PE routers 104 and corresponding CE routers 102. In steps 204-206, the RR 110 compares the routing update to one or more cost metrics and one or more preferences.

A cost metric can be represented by a transmission delay determined by the RR 110 for each of a plurality of routing configurations between one or more PE routers 104 affected by the routing update and a corresponding one or more destination points (e.g., CE or PE routers 102, 104). In another embodiment, a cost metric can represent a routing distance or speed of data transmission determined by said RR 110 for each of said plurality of routing configurations. In yet another embodiment, a cost metric can be based on a load balancing network utilization objective used by the RR 110 for distributing packet traffic in the MPLS network 105. Said objective can take into consideration load balancing metrics such as network element utilization, traffic density, congestion, and other suitable common load balancing metrics.

Preferences referred to in step 206 can represent customer and/or service provider preferences for managing traffic of one or more VPNs. A preference can represent a temporal preference for managing data traffic in the MPLS network 105. For instance, traffic management can be treated differently at various times of the day based on detectable traffic patterns (e.g., peak traffic, low traffic, nominal traffic). In another embodiment, a preference can be geographic. For example, a customer may have a geographic preference as to how VPN traffic is to be managed (e.g., preferences for East coast versus West coast data traffic). In yet another embodiment a preference can represent a desired reliability of service for the VPN by the customer or service provider (e.g., 99.999% fault-free 24-7 communication services).

In another embodiment, a preference can represent a desired Quality of Service (QoS) which set limits on jitter, end-to-end delay, and other factors that can affect the quality of service of a particular VPN. Preferences can also be derived from service metrics defined in a Service Level Agreement (SLA) established with a subscriber of the MPLS network 105. The service metrics can include without limitation reliability of service metrics, QoS metrics, routing preferences on the basis of geography, and any other suitable preferences that can be established between the service provider of the MPLS network 105 and a subscriber.

The aforementioned embodiments for cost metrics and preferences can be used singly or in combination by the RR 110 when processing the routing update in steps 204-206. Accordingly, the RR 110 can process the routing update based on one or more cost metrics in step 204, and/or one or more preferences in step 206, each of which can lead to step 208 where the RR generates a plurality of dissimilar routing advertisements from said processing. Each routing advertisement produces a routing configuration in the communication system 100 that differs from a routing configuration that would have been produced by the routing update (see "Step 3" of FIG. 1) submitted in step 202. The dissimilarities in the routing configurations resulting from the routing advertisements of step 208 is due to the processing performed in step 204 and/or step 206, which the RR 110 uses to manage performance of the MPLS network 105 and/or satisfy preferences established by the service provider and/or its subscribers.

In a supplemental embodiment, the RR 110 can determine in step 210 whether the routing advertisements should target certain PE routers 104 and not others (steps 212-214), target all PE routers assigned to the RR (step 216), or target some PE routers with the routing advertisements of step 208 while other PE routers receive an unadulterated copy of the routing update as is done traditionally by common RRs (steps 218-220).

FIG. 1 provides an exemplary illustration of the effects of the routing advertisements generated in step 208. In the illustration, the RR 110 selectively transmits two routing advertisements to a PE router 104 (Steps 3A and 3B). These routing advertisements can, for example, belong to a Routing Target (RT) 100 which has an association with a VPN of a CE router 102 that initiated the routing update (see Step 1). As a result of processing the routing update based on the cost metrics and/or preferences of steps 204-206, the RR 110 generates two routing advertisement each having different routing targets (RT 101, RT 102), dissimilar routing distinguishers (RDs), and routing instructions.

The routing distinguishers are chosen so that the receiving PE router 104 receiving said advertisements treats the advertisements separately rather than interpreting the advertisements as belonging to a single routing target (RT 100). The routing distinguishers prevent the recipient PE router 104 from ignoring or discarding one of the advertisements. The routing instructions can represent without limitation routing preferences, default routes, and/or any other suitable instruction which the CE routers 102 associated with the recipient PE router 104 can use to route traffic generated thereby.

Referring back to FIG. 2, the recipient PE router 104 (associated with "Steps 3A-3B" of FIG. 1) decides in step 222 whether or not the routing advertisements belong to one or more VPN served by it. If it does not, it ignores the advertisement. Otherwise in step 224 it transmits said advertisements to its corresponding CE router(s) 102 (see "Step 4A and 4B" of FIG. 1). In cases where the RR 110 targets specific PE routers 104 with the advertisements (steps 212-214), the recipient PE routers will always forward the advertisements in whole or in part to the CE routers 102. In cases where the advertisements are routed to all PE routers 104 served by the RR 110, some recipient PE routers 104 will ignore the advertisement if it is not part of its community of VPN(s) (see "Step 5" of FIG. 1). Combined results occur in the hybrid model (steps 218-220 of FIG. 2) where the routing update is advertised in its original form for some PE routers 104, while the regenerated advertisements (e.g., "Steps 3A-3B" of FIG. 1) are submitted to targeted PE routers.

The CE routers 102 receiving the regenerated advertisements ("Steps 3A-3B of FIG. 1) will route its traffic according to the given routing targets (e.g., RT 101 and RT 102, respectively) and routing instructions which identify preferred and default routes. This form of sub-routing (or sub-VPNs) can be useful to the service provider and/or to subscribers of the MPLS network 105 to efficiently route traffic in the network.

For example, a subscriber may have satellite CE routers 102 located in the West coast and East coast offices in the United States. Internet traffic for each of these satellite offices can be handled at either San Francisco or New York offices. The RR 110 can be programmed with cost metrics and/or preferences of the subscriber in steps 204 and/or 206 to generate in step 208 from a routing update from either San Francisco or New York routers multiple routing advertisements directed to the West coast and East coast CE routers 102 (by way of their respective PE routers 104). These dissimilar routing advertisements can direct the West coast CE routers 102 to utilize the San Francisco routers and the East coast CE routers to utilize the New York routers, thereby configuring said offices for more efficient routing configurations.

A prior art RR 110 would have submitted the routing updates of the San Francisco and New York routers to all PE routers 104 inevitably getting to the aforementioned CE routers in the West and East coast offices. Based on the random nature of processing traditional routing updates, the CE routers 102 in the West coast offices can inadvertently update its VRF tables and route traffic to New York, while the East coast CE routers can inadvertently route traffic to San Francisco. Undesirable results such as this which can impact the performance of the MPLS network 105 and among other things violate an SLA of a subscriber due to excessive jitter, delay or like conditions, can be avoided by method 200.

From the foregoing descriptions, it would be evident to an artisan with ordinary skill in the art that the aforementioned embodiments can be modified, reduced, or enhanced without departing from the scope and spirit of the claims described below. Accordingly, the reader is directed to the claims below for a fuller understanding of the breadth and scope of the present disclosure.

FIG. 3 depicts an exemplary diagrammatic representation of a machine in the form of a computer system 300 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 300 may include a processor 302 (e.g., a central processing unit (CPU), a graphics processing unit (GPU, or both), a main memory 304 and a static memory 306, which communicate with each other via a bus 308. The computer system 300 may further include a video display unit 310 (e.g., a liquid crystal display (LCD), a flat panel, a solid state display, or a cathode ray tube (CRT)). The computer system 300 may include an input device 312 (e.g., a keyboard), a cursor control device 314 (e.g., a mouse), a disk drive unit 316, a signal generation device 318 (e.g., a speaker or remote control) and a network interface device 320.

The disk drive unit 316 may include a machine-readable medium 322 on which is stored one or more sets of instructions (e.g., software 324) embodying any one or more of the methodologies or functions described herein, including those methods illustrated above. The instructions 324 may also reside, completely or at least partially, within the main memory 304, the static memory 306, and/or within the processor 302 during execution thereof by the computer system 300. The main memory 304 and the processor 302 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 324, or that which receives and executes instructions 324 from a propagated signal so that a device connected to a network environment 326 can send or receive voice, video or data, and to communicate over the network 326 using the instructions 324. The instructions 324 may further be transmitted or received over a network 326 via the network interface device 320.

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. .sctn.1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:

accessing first and second modified versions of a proposed routing update provided by a route reflector, the route reflector to provide the first and second modified versions to a first provider edge router and to provide an unmodified version of the proposed routing update to a second provider edge router in response to determining that the proposed routing update represents an undesirable routing configuration for the first provider edge router, the proposed routing update being received at the route reflector and originated at a first customer edge router;

forwarding the first modified version of the proposed routing update received from the route reflector from the first provider edge router to a second customer edge router, the first modified version of the proposed routing update including a first route target different from a second route target of the unmodified version of the proposed routing update; and forwarding the second modified version of the proposed routing update received from the route reflector from the first provider edge router to a third customer edge router, the second modified version of the proposed routing update including a third route target different from the second route target, the first modified version being different from the second modified version of the proposed routing update.

2. A method as defined in claim 1, further comprising forwarding a second proposed routing update received from the second customer edge router to the route reflector.

3. A method as defined in claim 1, further comprising determining whether a first routing advertisement including the first modified version of the proposed routing update is associated with a virtual private network served by the first provider edge router.

4. A method as defined in claim 3, further comprising discarding the first route target of the first modified version of the proposed routing update when the virtual provider network is not served by the first provider edge router.

5. A method as defined in claim 1, wherein the desirability of the proposed routing update is based on a cost metric associated with the proposed routing update relative to the first provider edge router.

6. A method as defined in claim 1, wherein the desirability of the proposed routing update is based on a preference of an entity associated with the first provider edge router.

7. A first provider edge router, comprising:

a memory comprising machine readable instructions; and a processor to execute the machine readable instructions to perform operations comprising:

accessing first and second modified versions of first and second modified versions of a proposed routing update provided by a route reflector, the route reflector to provide the first and second modified versions to the first provider edge router and to provide an unmodified version of the proposed routing update to a second provider edge router in response to determining that the proposed routing update represents an undesirable routing configuration for the first provider edge router, the proposed routing update being received at the route reflector and originated at a first customer edge router;

forwarding the first modified version of the proposed routing update received from the route reflector to a second customer edge router, the first modified version of the proposed routing update including a first route target different from a second route target of the unmodified version of the proposed routing update; and forwarding the second modified version of the proposed routing update received from the route reflector to a third customer edge router, the second modified version of the proposed routing update including a third route target different from the second route target, the first modified version being different from the second modified version of the proposed routing update.

8. A provider edge router as defined in claim 7, wherein the operations further comprise forwarding a second proposed routing update received from the second customer edge router to the route reflector.

9. A provider edge router as defined in claim 7, wherein the operations further comprise determining whether a first routing advertisement including the first modified version of the proposed routing update is associated with a virtual private network served by the first provider edge router.

10. A provider edge router as defined in claim 9, wherein the operations further comprise discarding the first route target of the first modified version of the proposed routing update when the virtual provider network is not served by the first provider edge router.

11. A provider edge router as defined in claim 7, wherein the proposed routing update is to be evaluated by analyzing a cost metric associated with the proposed routing update.

12. A provider edge router as defined in claim 7, wherein the proposed routing update is to be analyzed based on a preference of an entity associated with the first provider edge router.

13. A tangible machine readable storage device comprising instructions which, when executed, cause a machine to perform operations comprising:

accessing first and second modified versions of a proposed routing update provided by a route reflector, the route reflector to provide the first and second modified versions to a first provider edge router and to provide an unmodified version of the proposed routing update to a second provider edge router in response to determining that the proposed routing update represents an undesirable routing configuration for the first provider edge router, the proposed routing update being received at the route reflector and originated at a first customer edge router;

forwarding the first modified version of the proposed routing update to a second customer edge router, the first modified version of the proposed routing update including a first route target different from a second route target of the unmodified version of the proposed routing update; and forwarding the second modified version of the proposed routing update to a third customer edge router, the second modified version of the proposed routing update including a third route target different from the second route target, the first modified version being different from the second modified version of the proposed routing update.

14. A tangible machine readable storage device as defined in claim 13, wherein the operations further comprise forwarding a second proposed routing update received from the second customer edge router to the route reflector.

15. A tangible machine readable storage device as defined in claim 13, wherein the operations further comprise determining whether a first routing advertisement including the first modified version of the proposed routing update is associated with a virtual private network.

16. A tangible machine readable storage device as defined in claim 15, wherein the operations further comprise discarding the first route target of the first modified version of the proposed routing update when the virtual provider network is not served by a particular provider edge router.

17. A tangible machine readable storage device as defined in claim 13, wherein the first and second modified versions of the proposed routing update are received from the route reflector.

18. A tangible machine readable storage device as defined in claim 13, wherein the proposed routing update is to be evaluated by analyzing a cost metric associated with the proposed routing update.

19. A method as defined in claim 1, wherein the first provider edge router is to forward the first and second modified versions of the proposed routing update to the second and third customer edge routers, respectively, based on the first and second modified versions of the proposed routing update having different route distinguishers.

20. A provider edge router as defined in claim 7, wherein the operations further comprise determining that the first and second modified versions of the proposed routing update are to be forwarded to the second and third customer edge routers, respectively, based on the first and second modified versions of the proposed routing update having different route distinguishers.

* * * * *